US012768855B2

(12) United States Patent
Dudek et al.

(10) Patent No.: US 12,768,855 B2
(45) Date of Patent: Oct. 20, 2026

(54) POSITIVE-DISPLACEMENT SAMPLING DEVICE DESIGNED TO IMPROVE THE GRASPING OF THE PISTON OF A PISTON-CAPILLARY SYSTEM

(71) Applicant: GILSON SAS, Villiers-le-Bel (FR)

(72) Inventors: Bruno Dudek, Orry-la-Ville (FR); Stéphane Guichardon, Bougival (FR); Hervé Malvoisin, Paris (FR)

(73) Assignee: GILSON SAS, Villiers-le-Bel (FR)

( * ) Notice: Subject to any disclaimer, the term of this patent is extended or adjusted under 35 U.S.C. 154(b) by 348 days.

(21) Appl. No.: 18/707,050

(22) PCT Filed: Nov. 4, 2022

(86) PCT No.: PCT/FR2022/052079
§ 371 (c)(1),
(2) Date: May 2, 2024

(87) PCT Pub. No.: WO2023/084175
PCT Pub. Date: May 19, 2023

(65) Prior Publication Data

US 2026/0160779 A1 Jun. 11, 2026

(30) Foreign Application Priority Data

Nov. 9, 2021 (FR) ....................................... 2111902

(51) Int. Cl.
*G01N 35/10* (2006.01)
*B01L 3/02* (2006.01)
*G01N 1/14* (2006.01)

(52) U.S. Cl.
CPC ........ *G01N 35/1072* (2013.01); *B01L 3/0206* (2013.01); *B01L 3/022* (2013.01);
(Continued)

(58) Field of Classification Search
CPC .... G01N 35/1072; G01N 1/14; B01L 3/0227; B01L 3/0279; B01L 3/022; B01L 3/0224; B01L 3/0275; B01L 3/0286; B01L 3/0206
See application file for complete search history.

(56) References Cited

U.S. PATENT DOCUMENTS 4,362,064 A * 12/1982 Marteau d'Autry .. B01L 3/0217 422/923
4,474,071 A * 10/1984 Marteau d'Autry .. B01L 3/0217 422/923
(Continued)

FOREIGN PATENT DOCUMENTS

WO 9105609 A1 5/1991

OTHER PUBLICATIONS

International Search Report for PCT/FR2022/052079 dated Feb. 23, 2023.

*Primary Examiner* — Helen C Kwok
(74) *Attorney, Agent, or Firm* — McDonald Hopkins LLC

(57) ABSTRACT

A positive-displacement sampling device, comprising an endpiece, an ejector, a fixed body secured to the endpiece, and movable pipetting equipment comprising a clamp system for gripping the upper end of a piston. A system for controlling the clamping collar of the clamp system is provided, the system comprising an elastic return spring arranged between the collar and a movable main body, this system being designed so that during the operation of grasping the piston, upon an axial movement of the equipment setting the body in a predetermined axial position with respect to the fixed body, the collar automatically moves from its loosening high position to its clamping low position, under the effect of the elastic return spring.

10 Claims, 16 Drawing Sheets

(52) U.S. Cl.
CPC ........... *B01L 3/0224* (2013.01); *B01L 3/0227* (2013.01); *B01L 3/0275* (2013.01); *B01L 3/0279* (2013.01); *B01L 3/0286* (2013.01); *G01N 1/14* (2013.01); *B01L 2400/0478* (2013.01)

(56) References Cited

U.S. PATENT DOCUMENTS

| | | | | |
|---|---|---|---|---|
| 2003/0074988 | A1 | 4/2003 | Suovaniemi et al. | |
| 2014/0298925 | A1* | 10/2014 | Voyeux ................. | B01L 3/0217<br>422/522 |
| 2016/0051978 | A1* | 2/2016 | Voyeux ................... | B01L 3/022<br>422/522 |
| 2016/0271602 | A1* | 9/2016 | Voyeux ................. | B01L 3/0279 |
| 2021/0106986 | A1 | 4/2021 | Malvoisin | |

* cited by examiner

POSITIVE-DISPLACEMENT SAMPLING DEVICE DESIGNED TO IMPROVE THE GRASPING OF THE PISTON OF A PISTON-CAPILLARY SYSTEM

CROSS-REFERENCE TO RELATED APPLICATIONS

This is the National Stage application of PCT international application PCT/FR2022/052079, filed on Nov. 4, 2022, which claims the priority of French Patent Application No. 2111902, filed Nov. 9, 2021, both of which are incorporated herein by reference in their entireties.

The present invention relates to the field of positive-displacement sampling devices, for example sampling pipettes also so-called laboratory pipettes or liquid transfer pipettes. They are intended for sampling and distribution of liquid in containers or the like. The invention also relates to positive-displacement sampling devices in the form of automata. As regards manual, single-channel or multi-channel pipettes, these are intended to be held in hand by an operator during the operations of sampling and dispensing a liquid, these operations being carried out by moving a control button obtained by the application of an axial pressure on this same button. For so-called positive-displacement pipettes, these are intended to cooperate with consumables of the piston-capillary system type, the piston of which is intended to be directly in contact with the sample to be sampled, before being ejected or reused. Hence, the positive-displacement pipettes have a design different than that of more conventional air displacement pipettes, wherein the piston is an integral portion of the pipette and is not in direct contact with the sample.

In a known manner, the capillary is intended to be fitted over an endpiece of the pipette. The holding force of the capillary on the endpiece should be high enough to ensure that the capillary does not detach during the pipetting operations, in particular during dispensing, and that being so irrespective of the viscosity of the liquid.

Moreover, the upper end of the piston is intended to be gripped by a clamp system comprising grasping members, such as fingers, as well as a ring for clamping these grasping members. Usually, the grasping members are movable in translation relative to the ring, between a radial clamping position of the grasping members and a radial loosening position of these same grasping members.

In the conventional case where the grasping members are movable in translation and where the ring that surrounds them remains fixed, it remains difficult to repeat the closure of the clamp system very accurately. Indeed, this closure principle results in not accurately controlling the exact location of the end of the piston on which the grasping members close radially, during the axial movement thereof.

Furthermore, this closure is performed irrespective of the position of the piston in the capillary at the time when the latter is fitted over the endpiece of the pipette, which creates another source of inaccuracy in grasping of the piston, resulting in a problem of repeatability.

To solve this problem, the operator has to perform a self-calibration operation intended to make the upper end of the piston slide between the grasping members, so as to ensure that the piston is pushed at the bottom of the capillary. Besides the fact that this self-calibration operation, when it is repeated by the operator, might prove to be tedious and generate problems of comfort and possibly the apparition of musculoskeletal disorders (TMS), it also results in having to provide for a sufficiently low clamping force of the piston in order to enable such a sliding between the grasping members. Hence, this condition opposes that of providing for a firm grasping of the piston, in order to guarantee the accuracy and the proper implementation of the pipetting operations. These two antagonistic conditions generate difficulties in the design of the pipettes. Similar problems are encountered on the other types of sampling devices, like automata. To address this problem, an object of the invention is a positive-displacement sampling device, comprising:

- an endpiece intended to carry a capillary of a piston-capillary system, the endpiece being hollow, centred on a longitudinal central axis of the endpiece;
- an ejector intended to eject the piston-capillary system, movable relative to the endpiece according to an ejection axial stroke between a rest high extreme position and an ejection low extreme position, the ejector comprising an ejection end intended to be in axial contact with a capillary end during the ejection stroke;
- a fixed body secured to the endpiece,
- a movable pipetting equipment movable in translation relative to the fixed body, the equipment comprising a movable main body and a clamp system for gripping a piston upper end, the clamp system comprising grasping members secured to a lower end of the movable main body, as well as a clamping ring of the grasping members, the ring being itself movable in translation relative to the grasping members between a radial clamping low position of the grasping members, in which these members urged radially inwards allow gripping the upper end of the piston located between these grasping members, and a radial loosening high position of the grasping members.

According to the invention, the movable pipetting equipment further includes a piston driving member a lower end of which is intended to contact the upper end of the piston during an operation of grasping the piston with the capillary fitted on the endpiece, the driving member, arranged between the grasping members, being mounted movable in translation relative to the movable main body between a maximum projection position and a minimum projection position, a first elastic return means forcing the driving member downwards relative to the movable main body, towards its maximum projection position.

The sampling device further comprises a control system of the clamping ring of the clamp system, the control system comprising a second elastic return means arranged between the clamping ring and the movable main body, this control system being designed so that during the operation of grasping the piston, upon an axial movement of the movable pipetting equipment causing the movable main body in a predetermined axial position with respect to the fixed body, the clamping ring automatically moves from its loosening high position to its clamping low position under the effect of the second elastic return means.

Finally, said predetermined axial position of the movable main body being accessible, during the axial movement of the movable pipetting equipment, only after the driving member has been moved relative to the movable main body towards its minimum projection position, by bearing thereof on the piston accommodated in the bottom of the capillary fitted on the endpiece, and by countering the force generated by the first elastic return means.

Thus, the invention confers a better repeatability, since it allows causing an automatic closure of the piston clamp system, with the following three features:

- it takes place only after the piston has been pushed to the bottom of the capillary;

it takes place without moving the grasping members upwards, but on the contrary by moving the clamping ring downwards around these grasping members;
- it takes place at a specific time point during the descent of the movable pipetting equipment, when the movable main body reaches said predetermined axial position with respect to the fixed body.

Besides the better repeatability for pipetting operations, the invention also offers comfort to the operator, since the latter no longer has to carry out self-calibration operations after installation of each piston-capillary system on the endpiece. Therefore, the pipetting operations could be performed more rapidly, for a better efficiency and an increased profitability.

Finally, it is also emphasised that the invention also allows transferring the ejection function onto a secondary system, while in existing systems, the ejection control is generally combined with the pipetting control, resulting in substantial forces.

Preferably, the invention has at least one of the following optional features, considered separately or in combination.

Preferably, the control system of the clamping ring includes a member for holding the clamping ring in the loosening high position, the holding member being connected to the clamping ring, the control system also including a control part mounted movable in rotation on the movable main body of the movable pipetting equipment, according to a control part axis of rotation, the control part comprising:

- a control finger intended to cooperate with a stop of the fixed body, so that during the downward axial movement of the movable pipetting equipment, pressing the finger on the stop causes the control part to pivot relative to the movable main body according to a first direction of rotation about the control part axis of rotation;
- a guide track of the holding member, the guide track having a blocking transverse portion in which the holding member is held axially with respect to the control part, so as to hold the clamping ring in its loosening high position with respect to the grasping members, the guide track also having a sliding axial portion in which the holding member could slide during the automatic movement of the clamping ring from its loosening high position towards its clamping low position, under the effect of the second elastic return means, the blocking cross-section and the sliding axial portion connecting to one another at a junction area in which the holding member is brought at a predetermined level of rotation of the control part in the first direction of rotation, caused by the control finger when the movable main body has reached its predetermined axial position with respect to the fixed body;
- a third elastic return means forcing the control part to pivot relative to the movable main body according to a second direction of rotation about the axis of rotation of the control part, the second direction being opposite to the first direction.

Thus, the above-described preferred technical solution enables an automatic closure of the clamp system, simply via mechanical elements. Nevertheless, other solutions, also of mechanical nature, may be considered but may also comprise electrical and/or magnetic components, such as position sensors, etc.

Preferably, the guide track has an L-like general shape.

Preferably, the control system of the clamping ring further includes:

- a gear wheel for driving the clamping ring from its clamping low position towards its loosening high position, the gear wheel being mounted movable in rotation on the control part;
- a connection member carrying the holding member at one of its ends, and, at the other end, coupled eccentrically in rotation to the gear wheel; and
- a rack directed axially and carried by the ejector, the rack being intended to cooperate with the gear wheel during an operation of ejection of the piston-capillary system. Advantageously, the aforementioned means allow causing opening of the clamp system in a simple and reliable manner, and requiring only a small space.

In this context, the control system of the clamping ring is preferably designed so that during an operation of ejection of the piston-capillary system, during which the ejector performs a downward ejection axial stroke relative to the endpiece, towards its ejection low extreme position, the rack drives the gear wheel in rotation resulting in the movement of the connecting member upwards, causing the holding member to move upwards in the sliding axial portion of the guide track, the holding member driving with it the clamping ring towards its loosening high position, and also designed so that when the holding member reaches the junction area of the guide track, the third return elastic means forces the control part to pivot relative to the movable main body according to the second direction of rotation so as to accommodate the holding member in a bottom of the blocking transverse portion of the guide track.

Preferably, the control system of the clamping ring is designed so that the pivoting of the control part relative to the movable main body according to the second direction of rotation, under the action of the third elastic return means, causes separation of the gear wheel from the rack and breakage of the cooperation therebetween.

In addition, the sampling device also preferably comprises deflection means allowing bringing the rack closer to the movable pipetting equipment, according to a direction transverse to the longitudinal central axis, from a predetermined level of downward axial movement of the ejector, upon movement thereof between its rest high extreme position and its ejection low extreme position. When the deflection means remain inactive and the rack is then brought transversely away from the gear wheel, this allows avoiding an undesirable cooperation between these two elements, in particular during the pipetting operations during which the movable pipetting equipment is moved in translation relative to the rack of the ejector which remains fixed.

For example, this device is a positive-displacement sampling pipette, manual or motor-driven, single-channel or multi-channel, or a positive-displacement sampling automaton, single-channel or multi-channel.

In the case where the sampling device is of the multi-channel type, it preferably comprises a common control system for simultaneously controlling several clamping rings, and preferably all of the clamping rings of the clamp systems of the multi-channel sampling device. Alternatively, a distinct control system could be provided for each of the clamp systems of the multi-channel sampling device, without departing from the scope of the invention.

In the case where the sampling device is of the single-channel type, the holding member of the clamping ring in the loosening high position is preferably mounted on an upper end of the clamping ring, and also preferably slidably accommodated in an axial groove of the movable main body of the movable pipetting equipment.

Other advantages and features of the invention will appear in the non-limiting detailed description hereinbelow.

The description will be made with reference to the appended drawings, wherein.

Figure 4:
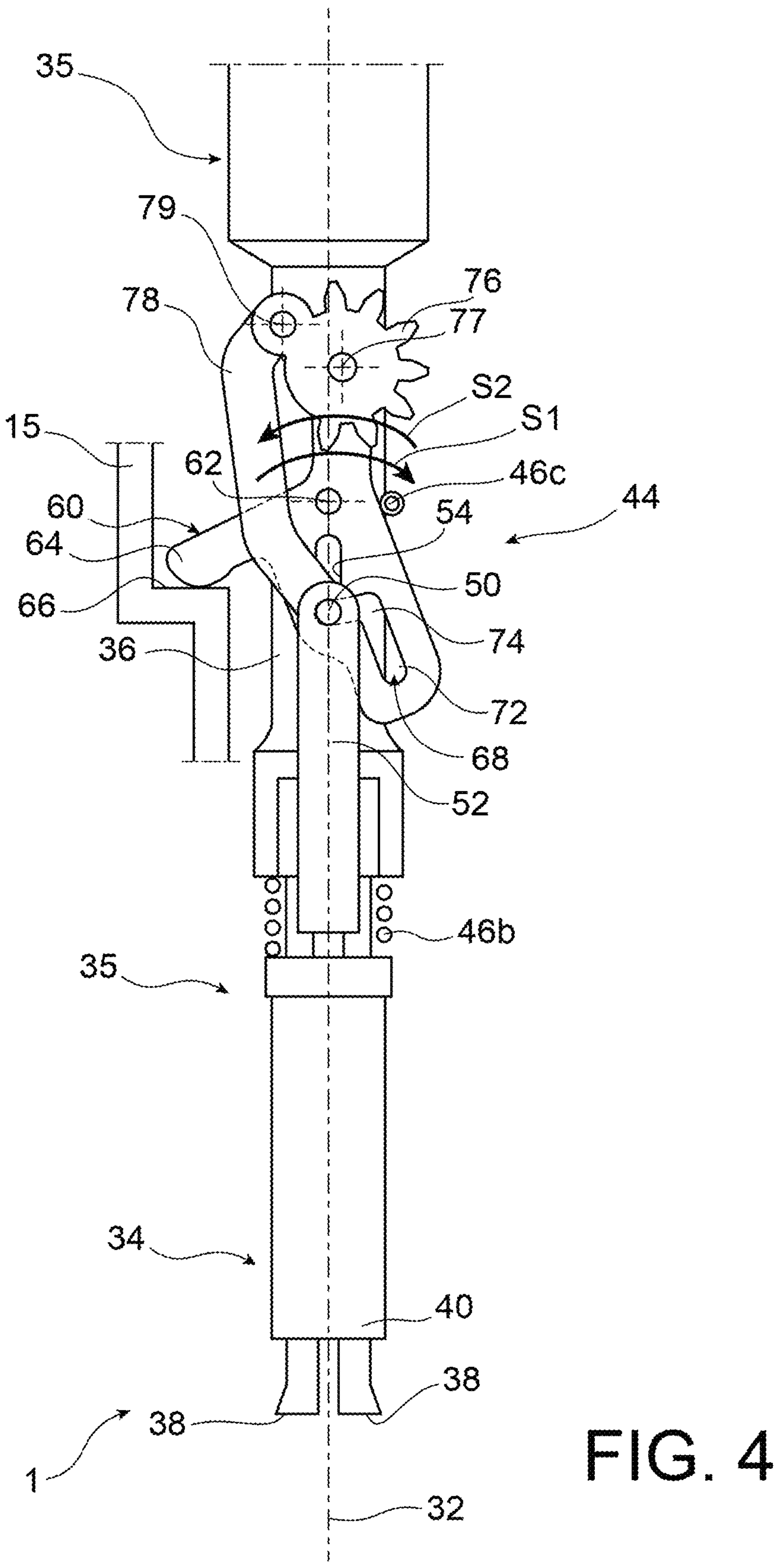
FIG. 4 shows a side view of the pipette shown in the previous figure.
Figure 5A:
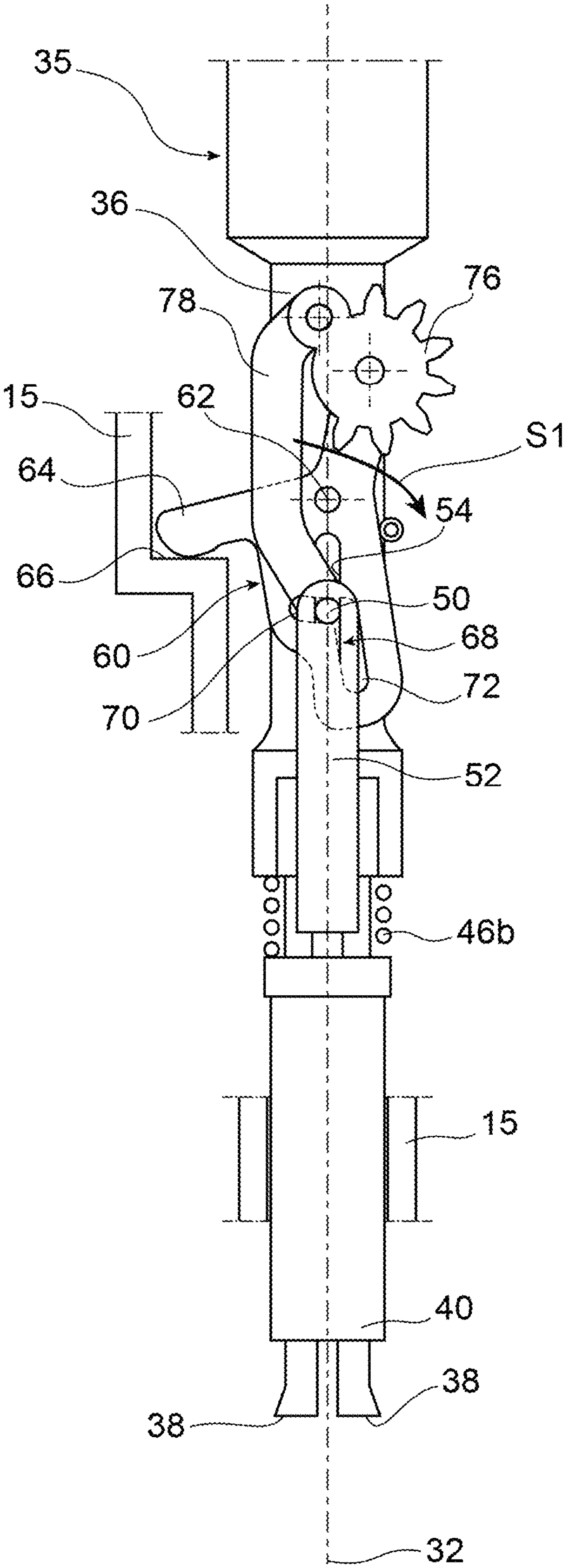
FIG. 5A shows a side view of the pipette similar to the view of FIG. 4, during an operation of grasping the piston.
Figure 5B:
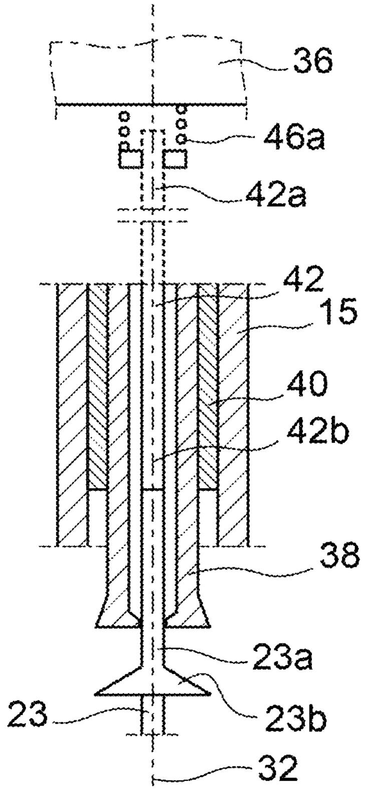
Figure 6A:
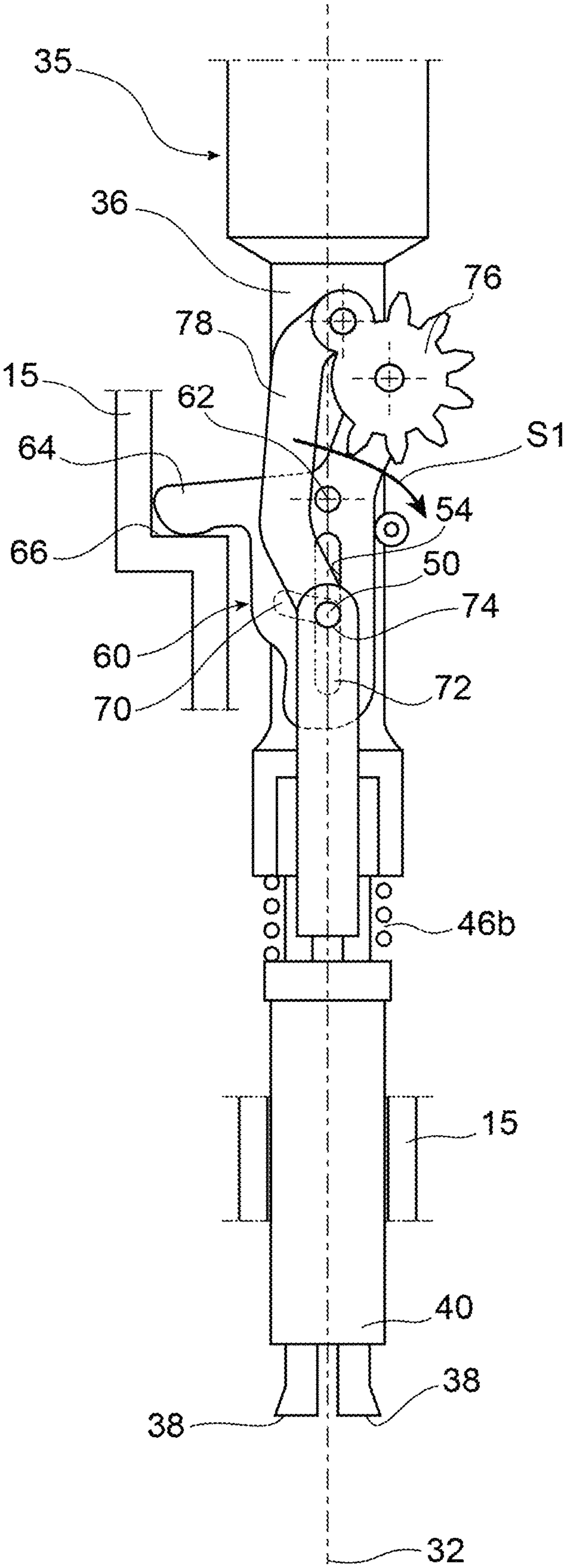
Figure 6B:
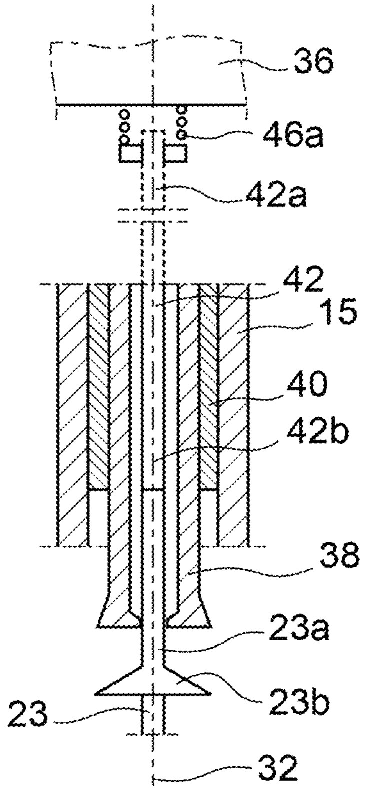
Figure 7:
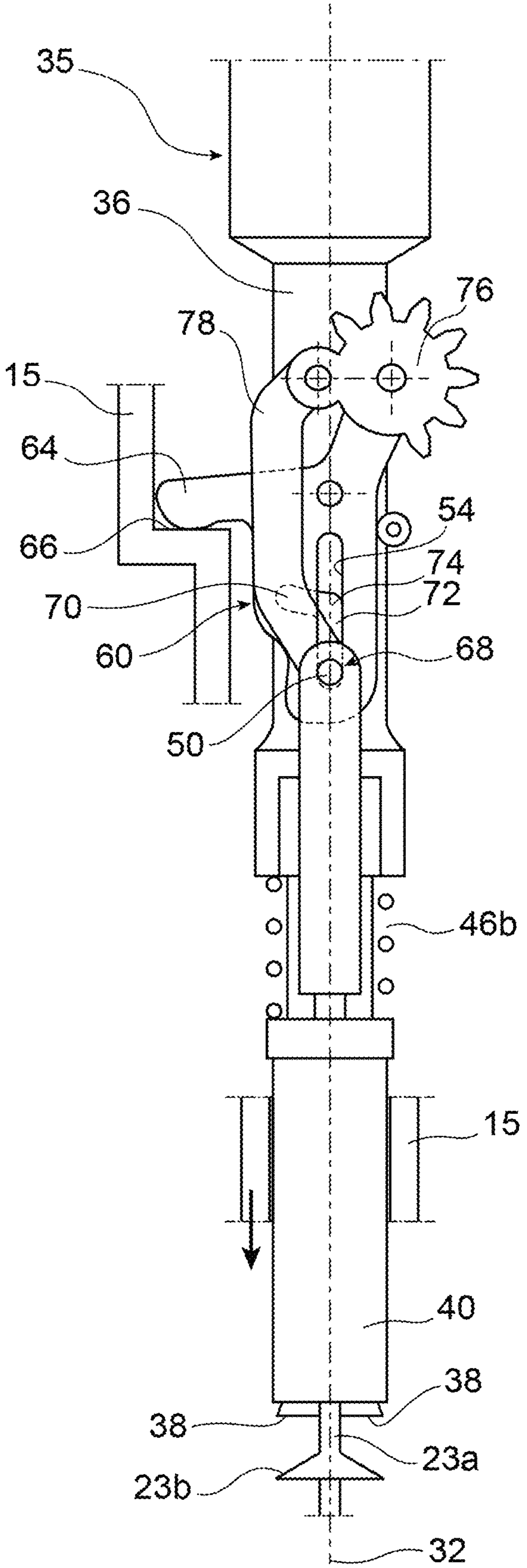
Figure 8:
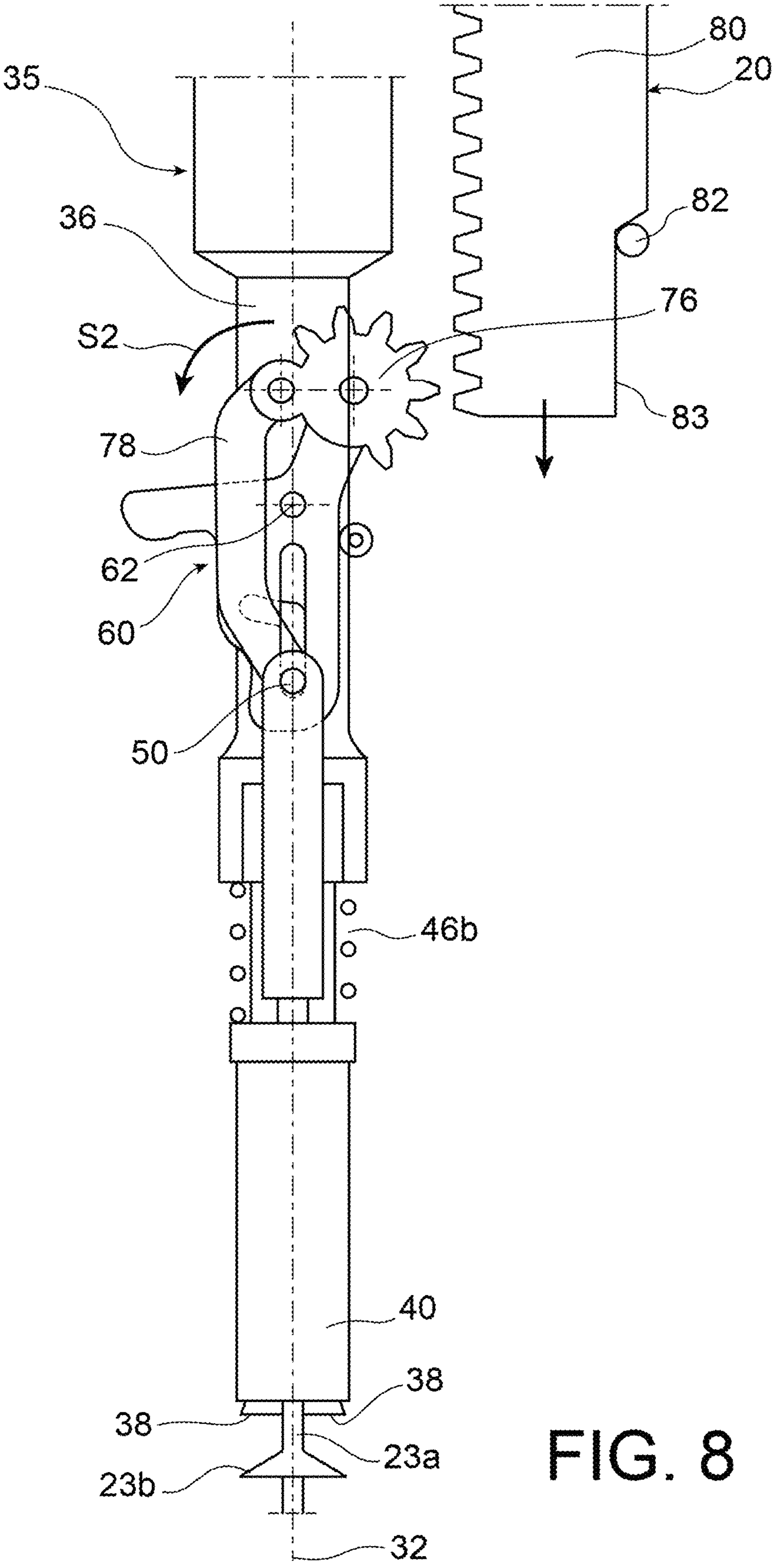
Figure 9:
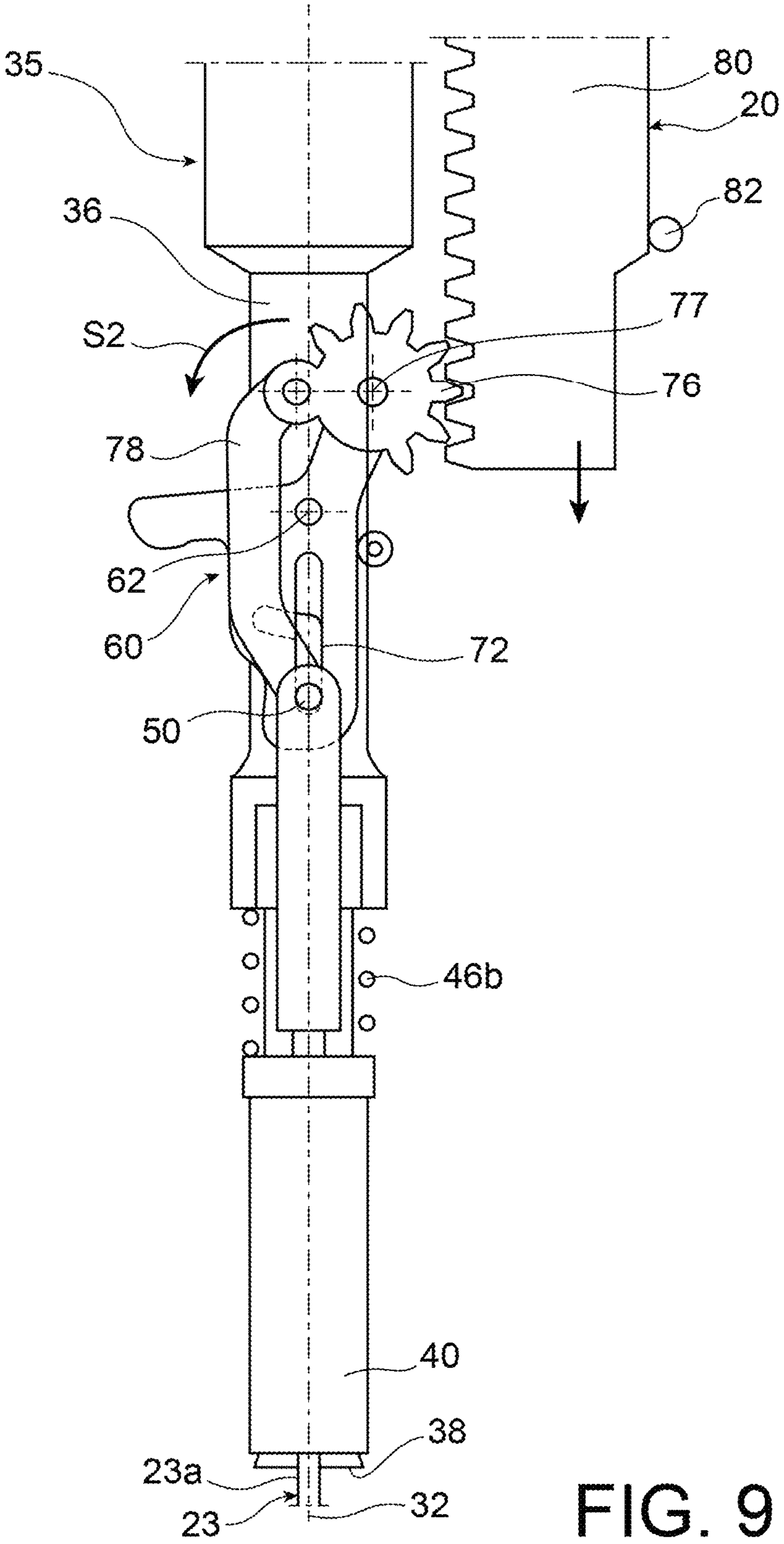
Figure 10:
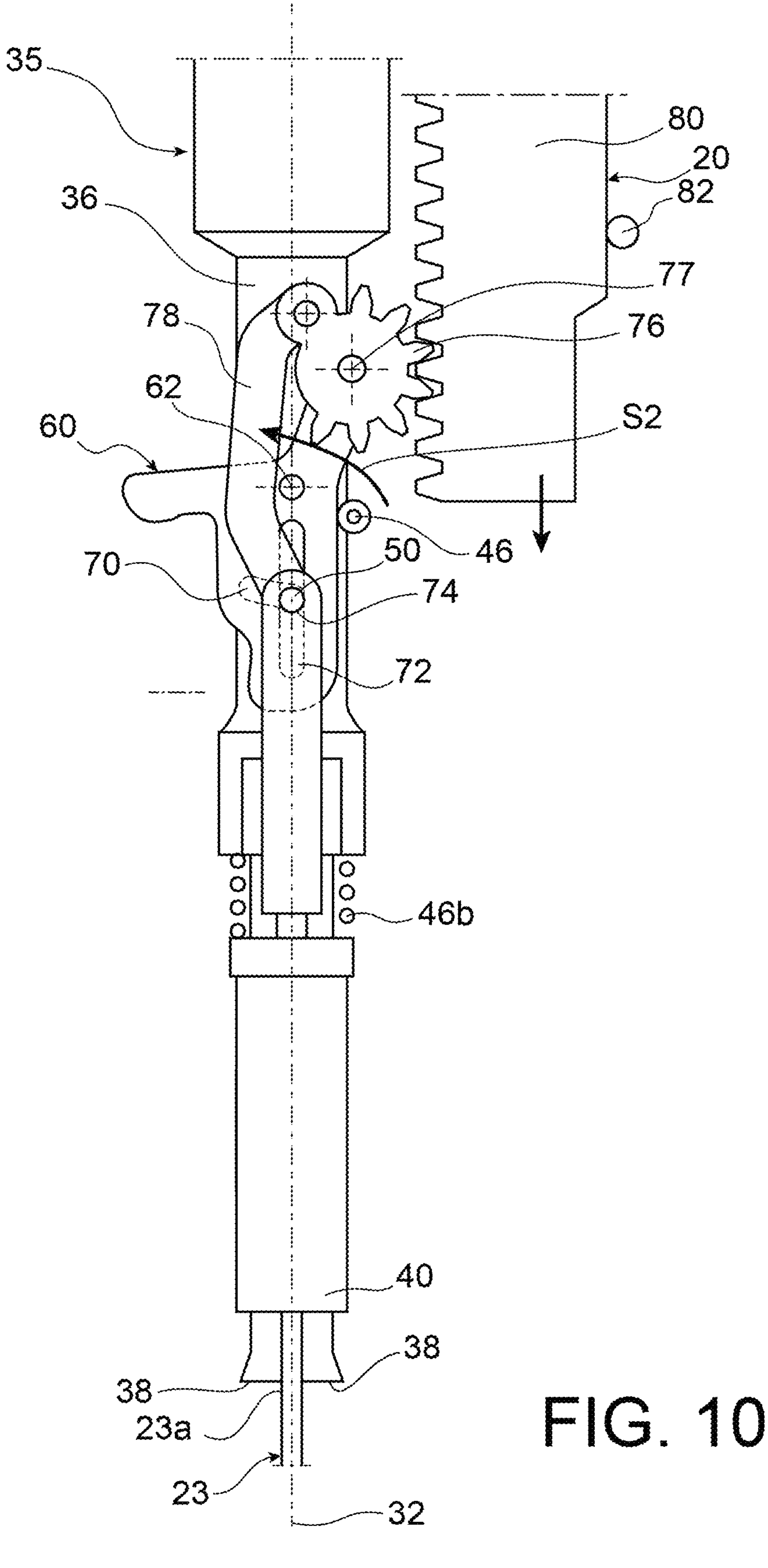
Figure 11:
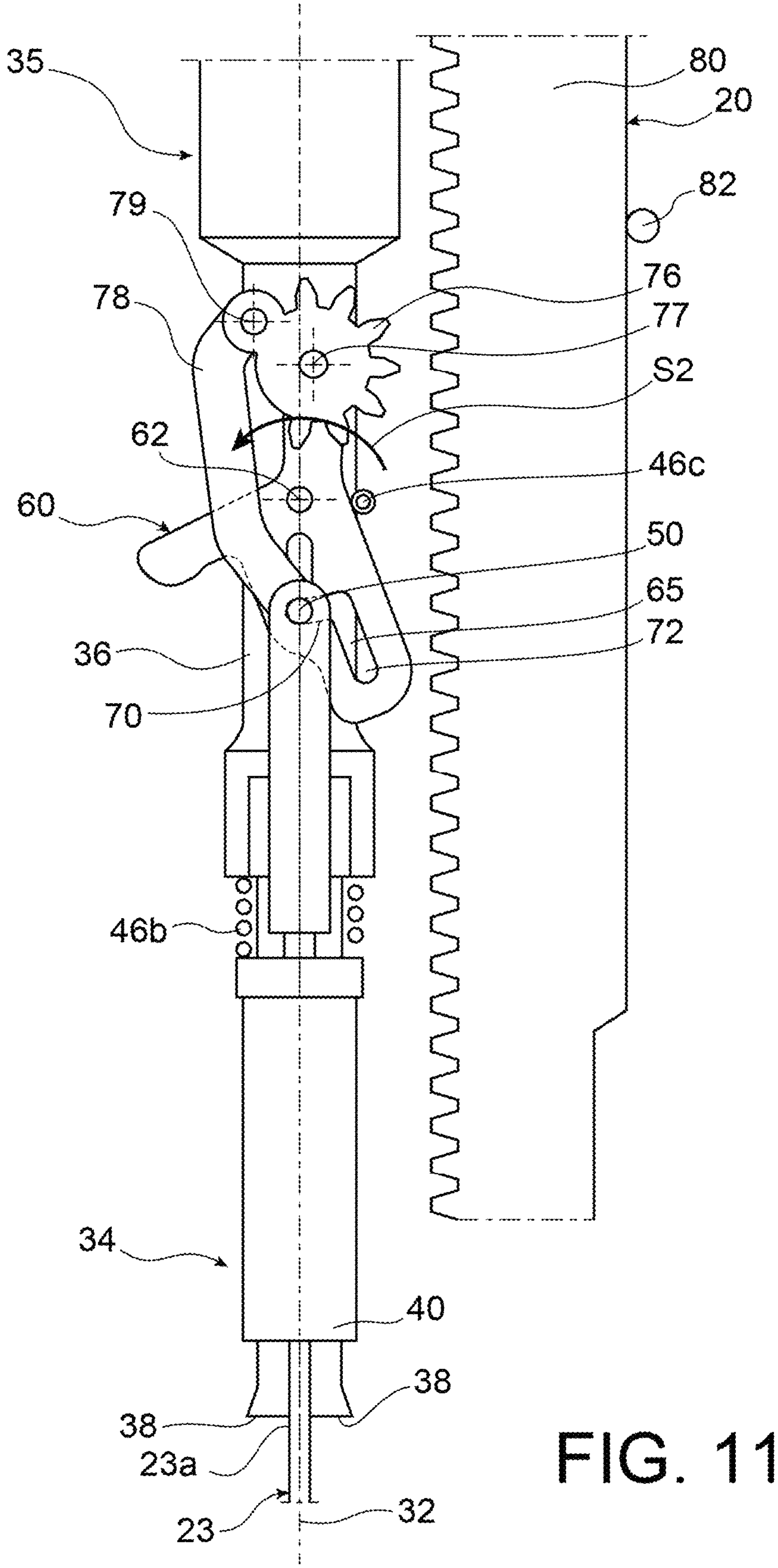
Figure 12:
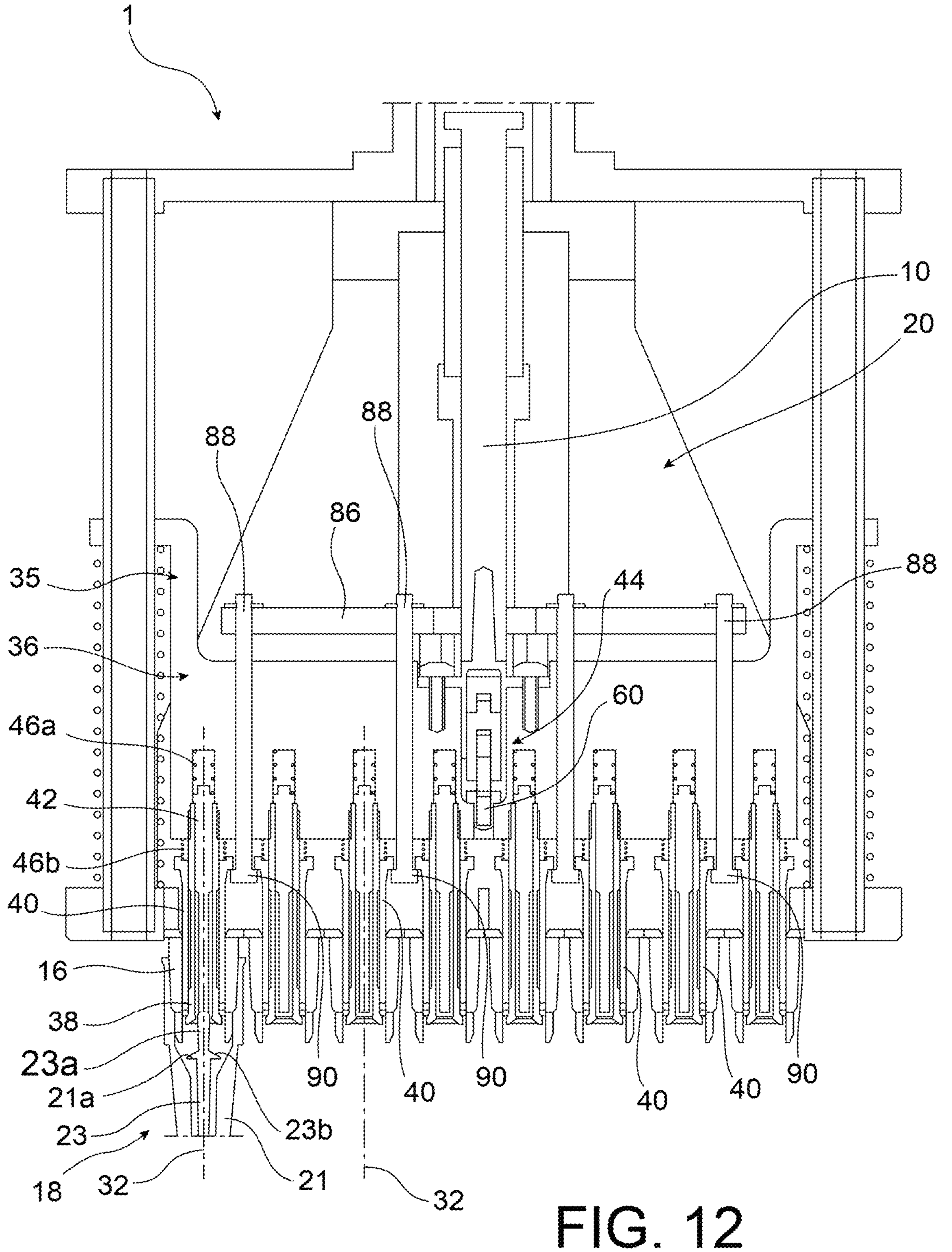
Figure 13:
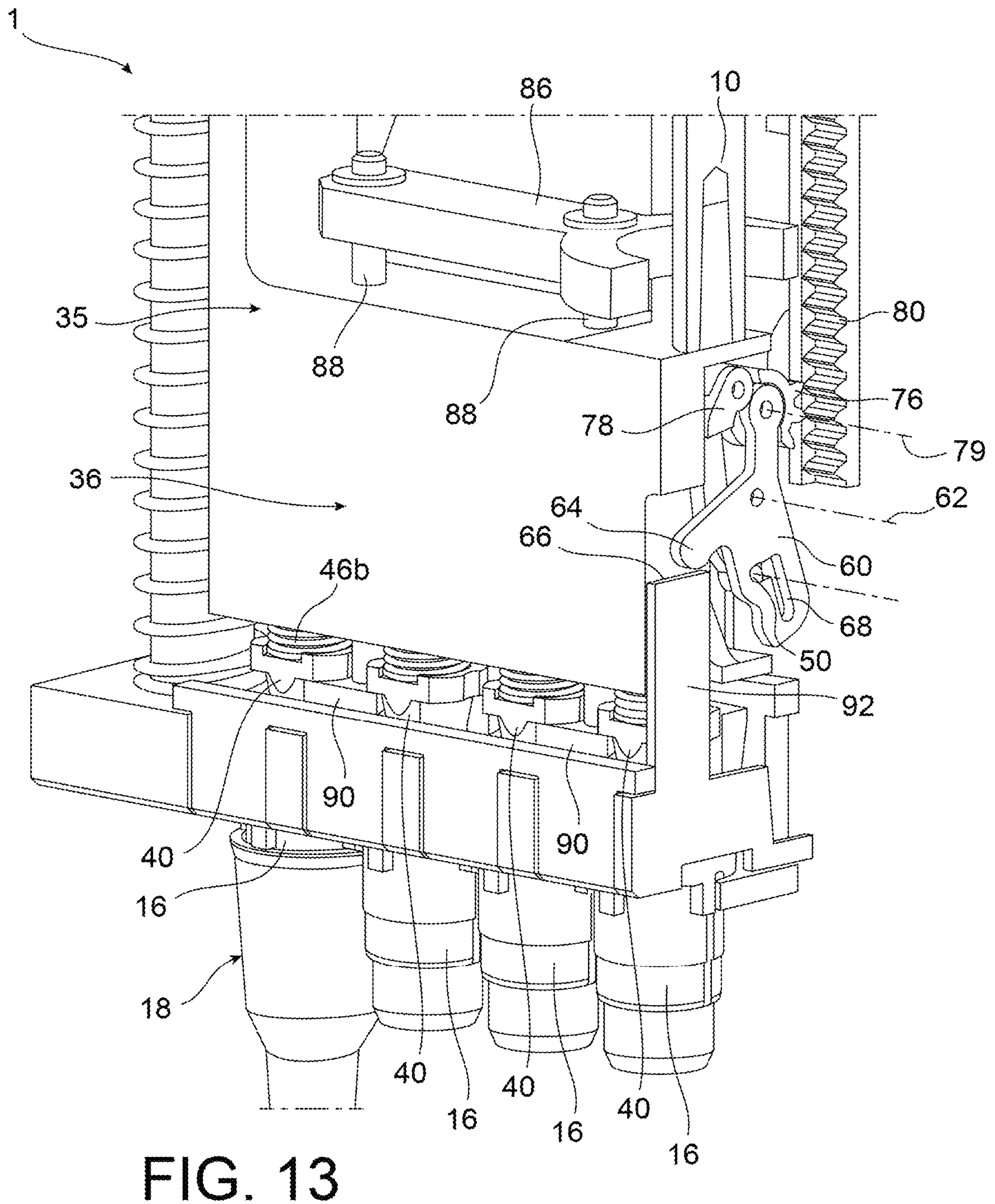
Figure 14:
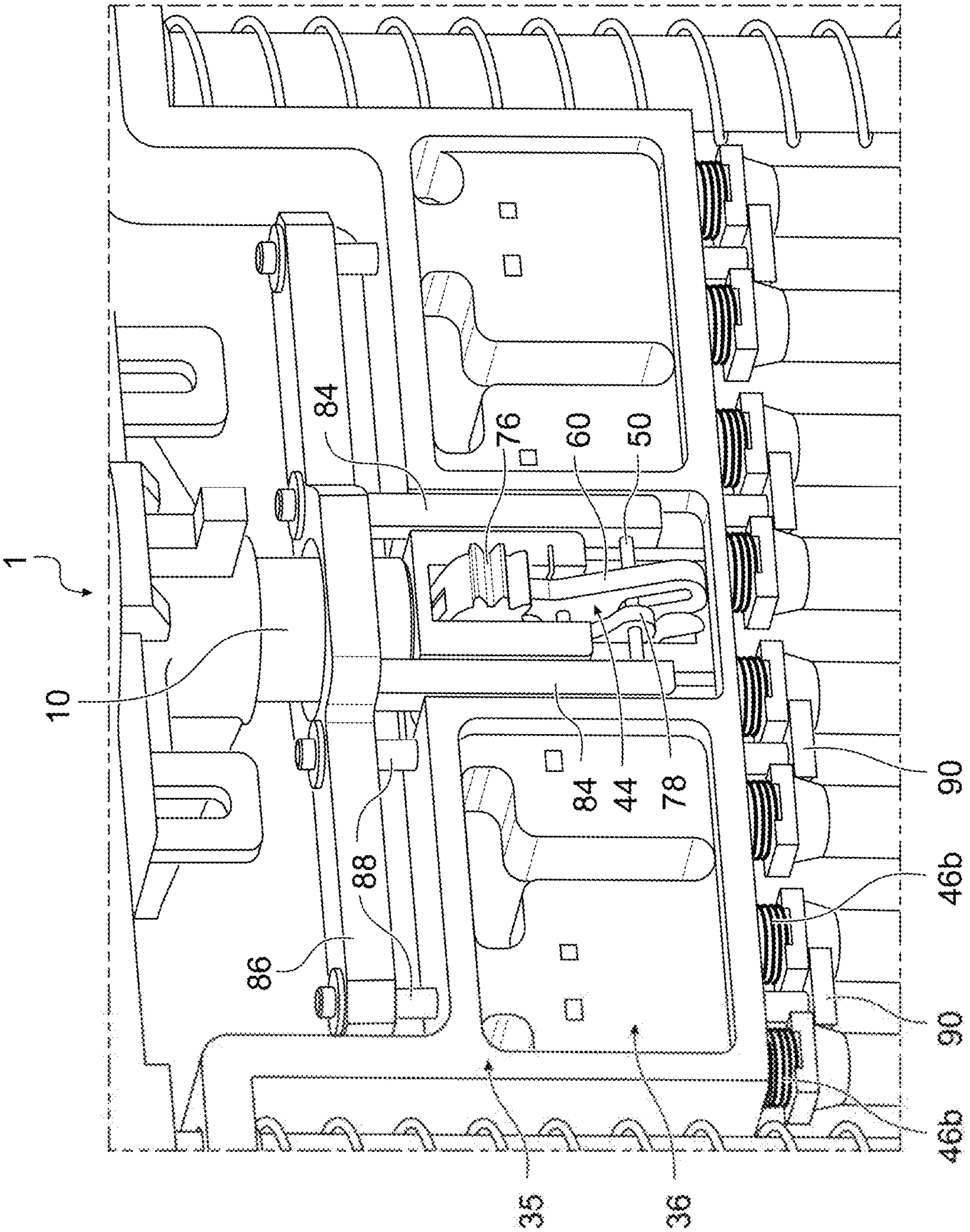

FIG. 5B corresponds to a longitudinal sectional view of a portion of the pipette shown in the previous figure;

FIG. 6A shows a side view of the pipette similar to the view of FIG. 5A, at a subsequent time point during the operation of grasping the piston;

FIG. 6B corresponds to a longitudinal sectional view of a portion of the pipette shown in the previous figure;

FIG. 7 shows a side view of the pipette similar to the view of FIG. 6A, at the end of the operation of grasping the piston;

FIG. 8 shows a side view of the pipette similar to the view of FIG. 4, during an operation of ejection of the piston-capillary system;

FIG. 9 shows a side view of the pipette similar to the view of FIG. 8, at a subsequent time point during the operation of ejection of the piston-capillary system;

FIG. 10 shows a side view of the pipette similar to the view of FIG. 9, at a subsequent time point during the operation of ejection of the piston-capillary system;

FIG. 11 shows a side view of the pipette similar to the view of FIG. 10, at the end of the operation of ejection of the piston-capillary system;

FIG. 12 shows a longitudinal sectional view of a multi-channel pipette according to a preferred second embodiment of the invention, the external cover of the pipette having been removed to reveal the internal elements of the pipette;

FIG. 13 shows a perspective view of a portion of the pipette shown in the previous figure, and FIG. 14 shows a perspective view of a portion of the pipette shown in FIGS. 12 and 13, according to another view angle.

Figure 1:
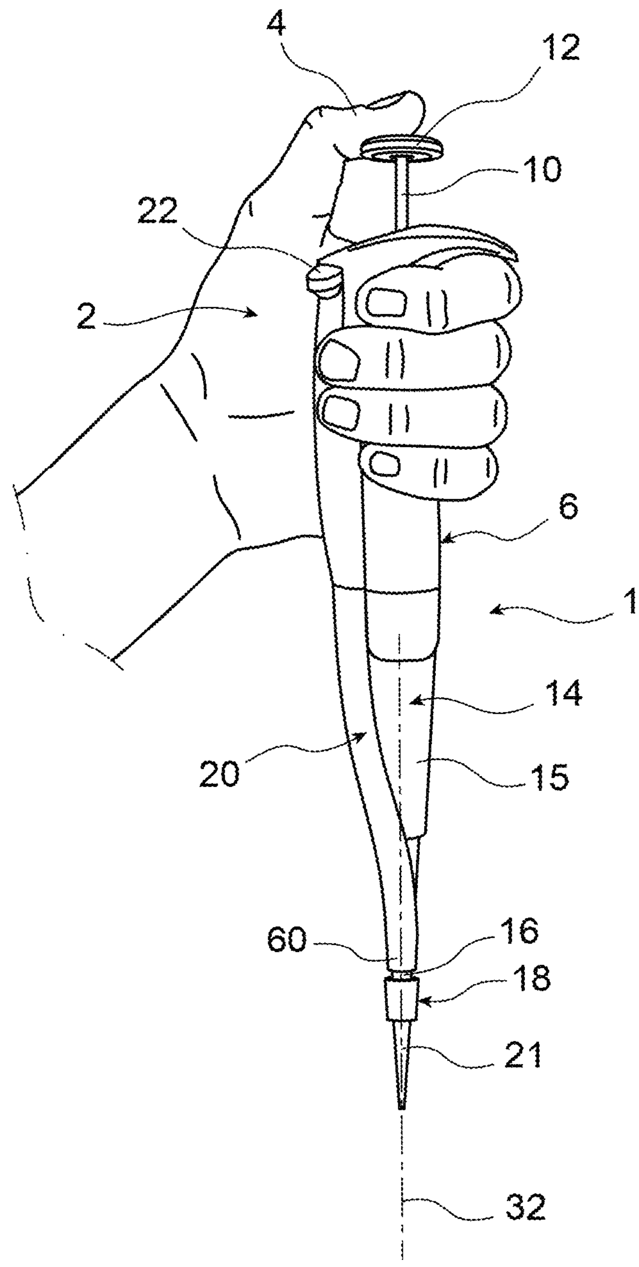
FIG. 1 shows a perspective view of a positive-displacement sampling pipette according to the invention.

Referring at first to FIG. 1, a manually-actuated single-channel positive-displacement sampling pipette 1 according to the present invention is shown. This manual pipette is also so-called "mechanical pipette". Throughout the following description, the terms "high" and "low" should be considered with the pipette held vertically, in the pipetting position or close to this same position.

FIG. 1 shows the pipette 1 held by the hand 2 of an operator, which, using his/her thumb 4, actuates the pipette to cause the dispensing of a liquid which has been sucked beforehand.

More specifically, the pipette 1 comprises a handle 6 forming an upper body of the pipette, from which handle a pipetting control rod 10 opens. The latter carries at its upper end, in the pipetting position, a control button 12 whose the upper portion is intended to be subjected to the pressure of the thumb 4 of the operator.

For indication, it should noted that a display screen (not shown) may be provided on the handle 6. Similarly, means for setting the volume to be sampled are also accessible to the operator on this handle 6.

Under the handle 6, the pipette 1 includes a removable bottom portion 14, including a fixed external body 15 of this bottom portion. The fixed external body 15 terminates downwards in an endpiece 16 receiving a consumable 18, so-called the piston-capillary system. In FIG. 1, only the capillary 21 of the system 18 is visible, since the piston is located inside the capillary 21 and the endpiece 16. In a known manner, after pipetting, the piston-capillary system 18 could be mechanically ejected by an ejector 20 the actuating button 22 of which projects for example from the top of the handle, proximate to the control button 12. The ejector 20 is movable according to an ejection axial stroke relative to the endpiece 16, between a rest high extreme position shown in FIG. 1, and an ejection low extreme position. In this respect, it should be noted that the ejector 20 comprises an ejection lower end 60 intended to be in axial contact with a capillary upper end 21 during the ejection stroke.

The pipetting control rod 10 is connected at its lower end to a clamp system (not visible in FIG. 1), capable of gripping and then releasing the upper end of the piston of the piston-capillary system 18, according to a manner specific to the invention which will be described hereinafter.

Figure 2:
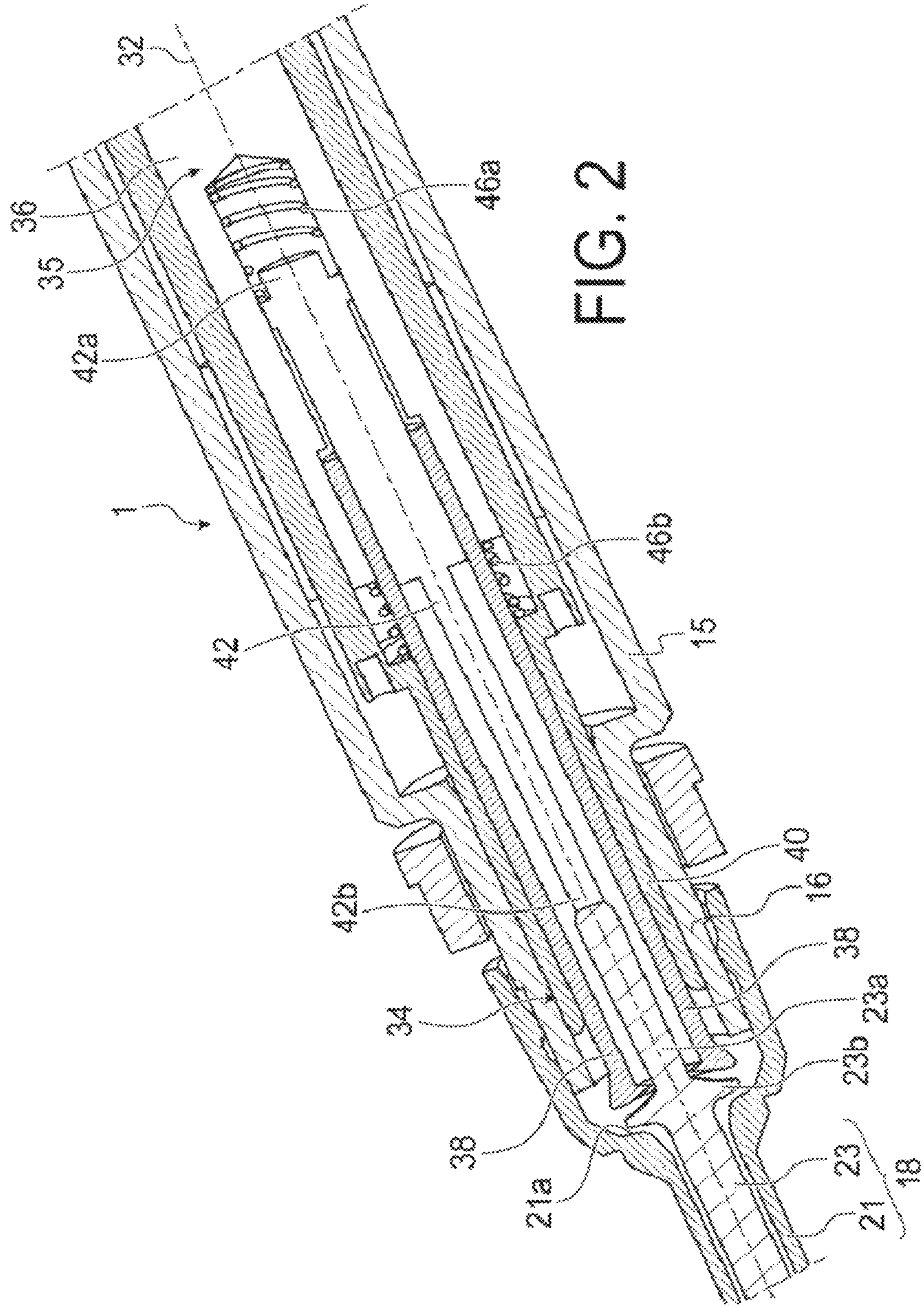
FIG. 2 shows a partial longitudinal sectional view of the pipette shown in the previous figure, according to a preferred first embodiment of the invention.
Figure 3:
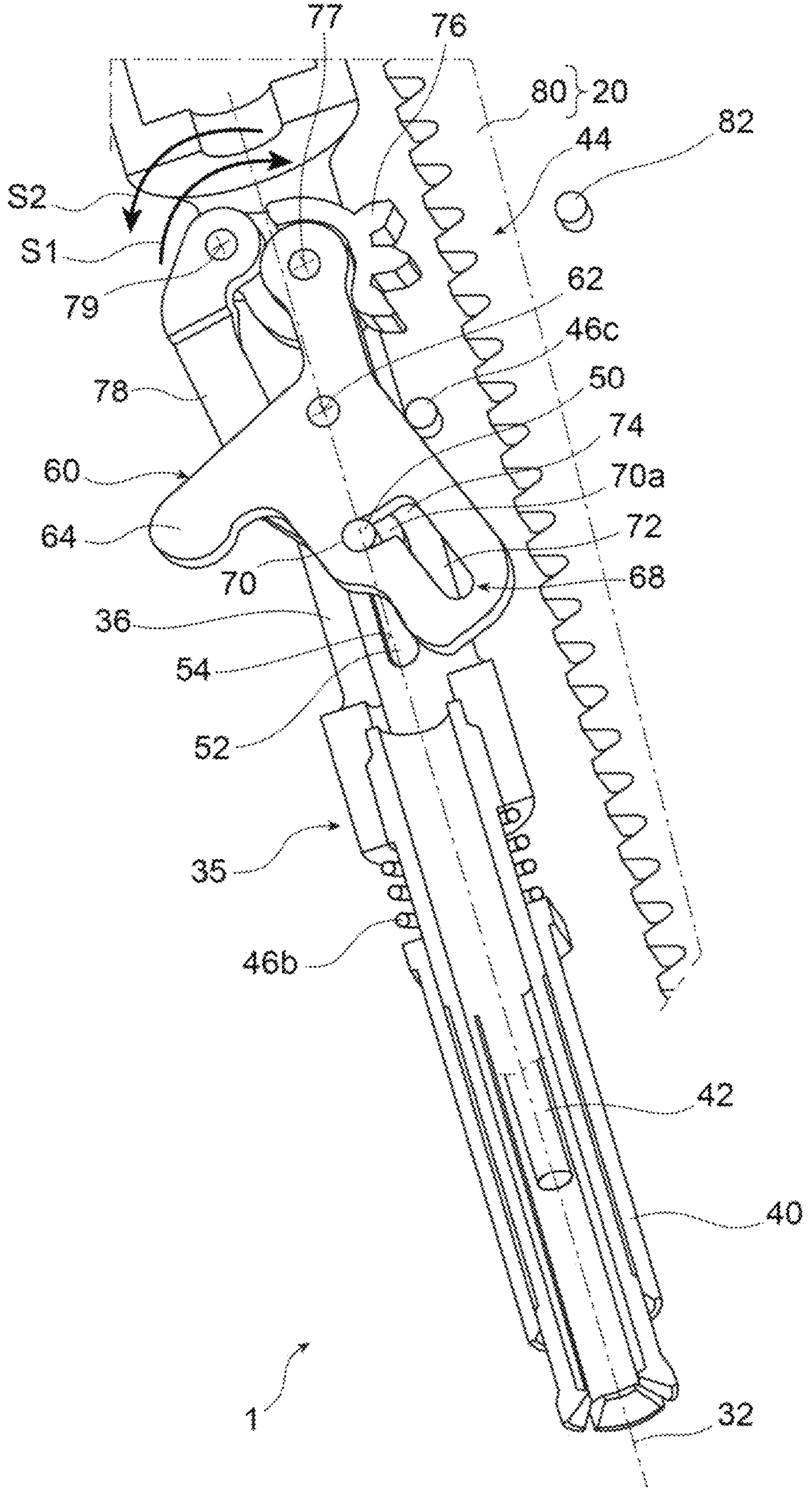
FIG. 3 shows a perspective view of the portion of the pipette shown in the previous figure.

Referring now to FIGS. 2 to 4, a portion of the pipette 1 according to a preferred first embodiment of the invention is shown, this portion generally including the inside of the pipette bottom portion, as well as the endpiece 16 and the ejector 20.

The endpiece 16, visible in FIG. 2, has a hollow shape while being centred on a longitudinal central axis 32 of the endpiece, herein corresponding to the longitudinal central axis of the single-channel pipette. The hollow of the endpiece 16 is intended to be crossed by the piston 23 of the piston-capillary system 18, whose upper end (23a) is gripped by the clamp system 34 driven by the pipetting control rod.

More specifically, the pipette includes a movable pipetting equipment 35, which is controlled in translation by the control rod (10) and the control button 12 shown in FIG. 1. Hence, this movable pipetting equipment 35 is movable in translation according to the axis 32, relative to the fixed external body 15 which surrounds it.

The equipment 35 includes, at the upper portion thereof, a movable main body 36, which is driven in translation by the control rod connected thereto at its upper end. It also includes the clamp system 34 for gripping the upper end 23a of the piston 23. This system 34 comprises grasping members 38 such as flexible fingers, secured to a lower end of the movable main body 36. It also comprises a ring 40 for clamping the fingers 38, the ring being centred on the axis 32 and arranged around the fingers 38. In turn, the clamping ring 40 is movable in translation according to the axis 32 relative to the fingers 38, between a radial clamping low position of the fingers, shown in FIG. 2 and in which the fingers urged radially inwards allow gripping the piston upper end 23a located between these fingers 38, and a radial loosening high position of the fingers shown in FIGS. 3 and 4. The fingers 38 have a pointed shaped head directed radially inwards, as is visible for example in FIGS. 2 and 3. This particular shape allows compensating for the closure controlled force by adding a firmer hold of the piston in the clamp, since these fingers have tips which will deform the plastic of the piston (pinching it). In this manner, it is possible to limit the holding force in the closed position of the clamp, ensured by the spring 46b which should be compressed when the clamp is opened to enable the ejection of the piston-capillary. This allows limiting the forces to be developed by the operator. The movable pipetting equipment 35 is completed by a piston driving member 42 which is best visible in FIG. 2, as well as by a particular system 44 for controlling the clamping ring of the clamp system, best visible in FIGS. 3 and 4.

The piston driving member 42 has a lower end 42*b* which, as will be described in detail hereinafter, is intended to contact the upper end 23*a* of the piston during an operation of grasping the piston with the capillary fitted over the endpiece. The driving member 42 is arranged between the fingers 38. It is mounted movable in translation according to the axis 32 relative to these fingers and to the movable main body 36 which carries them, and that being so between a maximum projection position and a minimum projection position shown in FIG. 2. At its upper end 42*a*, the driving member 42 cooperates with a compression spring type first elastic return means 46*a*. This spring 46*a* forces the driving member 42 downwards relative to the movable main body 36 on which it also bears, towards its maximum projection position.

The system 44 for controlling the clamping ring 40 is specific to the present invention, and it will be detailed hereinbelow, still with reference to FIGS. 2 to 4.

First of all, the system 44 comprises a second elastic return means 46*b*, also of the compression spring type, arranged between the clamping ring 40 and the lower end of the movable main body 36. As will be detailed later on, the control system 44 is designed so that during the operation of grasping the piston 23, upon an axial movement of the equipment 35 setting the movable main body 36 in a predetermined axial position with respect to the fixed body 15, the clamping ring 40 moves automatically under the effect of the second spring 46*b* from its loosening high position shown in FIGS. 3 and 4, to its clamping low position shown in FIG. 2.

The control system 44 also comprises a member 50 for holding the clamping ring 40 in the loosening high position. This holding member 50 is fixedly or rotatably mounted on an upper end 52 of the clamping ring. It is in the form of an axis or of a shaft directed transversely with respect to the longitudinal central axis 32 of the pipette, whereas the end 52 of the clamping ring, on which it is mounted at its two ends, is preferably in the form of two axial tabs arranged diametrically opposite to one another around the movable main body 36.

The holding member is also slidably accommodated in an axial groove 54 of the movable main body 36, or in two diametrically opposite identical grooves on this body 36, locally having a hollow shape.

Furthermore, the control system 44 includes a control part 60 mounted movable in rotation on the movable main body 36, according to an axis of rotation of the control part 62 parallel to the holding member 50. The control part 60, with a flat or substantially flat shape, comprises several elements intended to fill several functions.

First of all, the control part 60 comprises an eccentric control finger 64 intended to cooperate with an axial stop 66 of the fixed body 15, for example formed by a section break inside this same body 15. The assembly is designed so that during the downward axial movement of the equipment 35, bearing of the eccentric finger 64 on the axial stop 66 (shown in FIG. 4) causes the control part 60 to pivot relative to the movable main body 36, according to a first direction of rotation S1 about the axis of rotation 62.

The control part 60 also comprises a guide track 68 of the holding member 50. The guide track 68 is made by an aperture or a groove with an L-like general shape, directed downward in this preferred first embodiment of the invention. The guide track 68 has a blocking transverse portion 70 in which the holding member 50 is held axially with respect to the control part 60. The transverse portion is straight or slightly curved, and directed transversely or substantially transversely with respect to the axis 32. For example, it may consist of a portion corresponding to a circle arc with a small amplitude, centred on the axis of rotation 62 of the control part 60. The retention of the holding member 50, in the bottom 70*a* of the blocking transverse portion 70, ensures holding of the clamping ring in its loosening high position. The bottom 70*a* of the blocking transverse portion 70 corresponds to a distal end of this portion considered in the aforementioned first direction of rotation S1. To press the holding member 50 into the bottom 70*a*, a third elastic return means 46*c* is provided arranged between the movable main body 36 and the control part 60. Indeed, this means 46*c*, preferably in the form of a spring, causes the control part 60 to pivot relative to the movable main body 36 according to a second direction of rotation S2 about the axis of rotation of the control part 62, the second direction S2 being opposite to the first direction S1.

The guide track 68 also has a sliding axial portion 72, in which the holding member 50 could slide during the automatic movement of the clamping ring 40, from its loosening high position towards its clamping low position. The sliding axial portion 72 is directed parallel to the axis 32, or with a small angle with respect to this axis, according to the evolution of the inclination of the control part 60 during operation. Hence, this portion 72 extends downwards from another end of the blocking transverse portion 70, so that the two portions 70, 72 are connected to one another at a junction area 74 corresponding to the junction between the base and the branch of the L.

The control system 44 of the clamping ring 40 further includes a gear wheel 76 for driving the clamping ring from its clamping low position towards its loosening high position. The gear wheel 76 is mounted movable in rotation on the control part 60, according to a gear wheel axis of rotation 77 parallel to the axis 62. Meshed with the wheel 76, the control system 44 also comprises a rack 80 directed axially and carried by the ejector 20. The rack 80 is intended to cooperate with the gear wheel 76 during an operation of ejection of the piston-capillary system 18, as will be detailed hereinbelow. It should be noted that the pipette further includes deflection means 82, such as a deflection pin, allowing bringing the rack 80 closer to the equipment 35 from a predetermined level of downward axial movement of the ejector 20. Herein again, the operation of this deflection pin 82, schematically shown in FIG. 3, will be explained later on.

The system 44 also incorporates a connecting member 78 in the form of an arm, fixedly or pivotably carrying the holding member 50 at one of its ends. At the other one of its ends, the arm 78 is coupled eccentrically to the gear wheel 76, while being rotatably mounted on the latter according to an arm axis of rotation 79 parallel to the axis 77.

Referring now to FIGS. 2 to 7, the different steps of an operation of grasping the piston 23, which is performed with the capillary 21 fitted on the endpiece 16, and bearing in a support on a work surface, will be described. The grasping operation has an automatic nature, but it is triggered following the movement of the movable equipment 35 downwards, via the button and the control rod.

Before the downward movement of the equipment 35, the piston is in any position in the capillary, i.e. it does not necessarily rest in the bottom 21*a* of the capillary herein corresponding to the section narrowing portion from which the capillary has a small diameter hollow rod in which the piston slides (the hydraulic portion of the piston-capillary system). Alternatively, depending on the design of the piston-capillary system, the bottom could correspond to the lower end of the capillary, usually conical shaped and intended to cooperate with the lower end of the piston. Preferably, this design is adopted in the absence of a collar at the bottom of the upper end of the piston.

Moreover, the clamping ring 40 is held in the loosening high position, via the holding member 50, as shown in FIG. 3.

During the axial movement of the movable equipment 35, the control finger 64 comes into contact with the axial stop 66 of the fixed body 15, then makes the control part 60 pivot about its axis 62, in the first direction S1. The beginning of this pivoting phase of the control part 60 is schematised in FIGS. 5A and 5B. This pivoting of the control part 60 results in the relative movement of the control member 50 in the blocking transverse portion 70 of the guide track 68. Given the transverse orientation of the portion 70, the holding member 50 continues to hold the clamping ring 40 in its loosening high position. During the downward movement of the equipment 35, the piston driving member 42 which is in its maximum projection position comes into axial contact with the upper end 23*a* of the piston, and causes the latter to move to the bottom 21*a* of the capillary, if this position of the piston is not already occupied at the time of initiation of the grasping operation. Hence, one could herein observe bearing between the collar 23*b* of the piston located under its upper end 23*a*, and the capillary bottom 21*a*. As a reminder, it is indicated that the collar 23*b* is conventionally arranged axially between the upper end 23*a* of the piston, and the piston lower end which slides in the fine hollow rod of the capillary 21.

Upon continuation of the downward axial movement of the movable pipetting equipment 35, pressing of the driving member 42, on the piston accommodated in the bottom 21*a* of the capillary, causes this member 42 to move relative to the movable main body 36 towards its minimum projection position, against the force generated by the first spring 46*a*.

This relative movement of the driving member 42 forms some kind of safety which allows ensuring that the piston 23 is properly accommodated in the bottom 21*a* of the capillary 21 at the time point when closure of the clamp system intended to grip the piston takes place. Hence, to obtain such a function, it is essential to ensure that the friction forces of the piston moving in its capillary, are lower than the return force imparted by the first spring 46*a*.

After initiation of the relative movement of the driving member 42 towards its minimum projection position, the continuation of the descent of the equipment 35 causes the movable main body 36 to reach a predetermined axial position with respect to the fixed body 15, shown in FIGS. 6A and 6B. This particular position of the movable main body 15 also causes, thanks to the rotation applied by the finger 64, setting of the control part 60 to a predetermined level of rotation according to the first direction S1 about the axis 62. This level of rotation is such that it sets the holding member 50 at the end of the blocking transverse portion 70 of the guide track 68, in the junction area 74.

It is at this time point that the automatic closure of the clamp system takes place, under the effect of the second spring 46*b* which can expand and push the ring 40 downwards, around the fingers 38 to clamp them radially. This movement of the ring 40 is enabled by the holding member 50 which can move freely downwards in the sliding axial portion 72 of the guide track 68, to a lower end of this portion 72, as shown in FIG. 7 with the ring 40 in its clamping low position. At the same time as it moves in the sliding axial portion 72 of the guide track 68, the holding member 50 also slides downwards in the axial groove 54 of the movable main body 36.

Finally, it should be noted that during the rotation of the control part 60, the gear wheel 76 carried by this part 60 is offset transversely. Thus, the control part 60 is brought away from the axis 32, so as to adopt a position suited for carrying out a subsequent operation of ejection of the piston-capillary system, as will now be detailed hereinbelow with reference to FIGS. 8 to 11.

Such an ejection operation begins by loosening the clamp system, consisting in moving the ring 40 upwards in its loosening high position, in order to release the piston head 23*a*. To do so, the ejector 20 is actuated by the operator. When this ejector reaches a predetermined level of downward axial movement, schematised in FIG. 8, the continuation of its descent causes it to abut against the deflection pin 82, which pushes the rack 80 to move closer transversely to the axis 32. For example, a cam track 83 provided on the back of the rack 80 allows cooperating with the deflection pin 82, and obtaining the desired transverse deflection. Indeed, this observed deflection brings the teeth of the rack 80 to mesh with those of the gear wheel 76, as visible in FIG. 9. Therefore, the continuation of the descent of the ejector 20 causes the gear wheel 76 to rotate, and to drive upwards the arm 78 mounted eccentrically on this gear wheel 76. By moving upwards, the arm 78 causes the upward movement of the holding member 50 in the sliding axial portion 72, driving with it the ring 40 towards its release axial position visible in FIG. 10. Indeed, in this position, the holding member 50 has joined its highest position with respect to the movable main body 36, by fitting in the junction area 74 of the guide track.

At this stage, the third elastic return means 46*c* expands while forcing the control part 60 to pivot relative to the movable main body 36, according to the second direction S2. This causes the holding member 50 to be accommodated in the bottom 70*a* of the blocking transverse portion 70 of the guide track. As visible in FIG. 11, the clamping ring 40 is thus secured in its loosening high position, thereby releasing the piston 23 of the piston-capillary system to be ejected.

Raising of the clamping ring 40 is performed by loading the second spring 46*b*, which compresses between the ring 40 and the movable main body 36. Hence, it is done so that the return force of this spring 46*b* is lower than that of the pipetting spring (not shown) forcing the entire movable equipment 35 upwards.

Following the pivoting of the control part 60 under the action of the third elastic return means 46*c*, the gear wheel 76 is separated again from the rack 80, by approaching the axis 32. This results in a breakage of the cooperation between the wheel 76 and the rack 80, the latter continuing to be driven downwards with the ejector 20, until bearing thereof on the capillary and detachment of the latter from the pipette endpiece. During this detachment (not shown), the capillary is ejected from the pipette, bringing with it the piston which has been released from its clamp beforehand.

Once the ejection of the piston-capillary system is completed, the ejector 20 is released by the operator, so that it rises under the action of a dedicated spring (not shown), still by cooperating with the deflection pin 82.

The first embodiment which has been described hereinabove corresponds to a single-channel pipette, but the invention also applies to a multi-channel pipette like in the second embodiment which will be described hereinbelow, with reference to FIGS. 12 to 14.

In the figures, elements that bear the same reference numerals correspond to identical or similar elements. Consequently, one could observe that in the multi-channel pipette 1, several endpieces 16, herein eight, are provided. To simultaneously control the eight clamping rings 40, a control system 44 common to all these rings is preferably provided, preferably placed at the centre of the pipette, between two series of four endpieces. The holding member 50 is herein connected at its two ends to movable axial rails 84, fastened at their upper end to a transverse ramp 86 which slidably carries two axial tie rods 88 crossing the movable main body 36. At the lower end of these tie rods 88, axial stops 90 hold a collar in the top portion of each clamping ring 40. In turn, the second return spring **46*b* is located between the lower end of the mass body 36 crossed by the tie rods 88, and the collar of the associated ring 40. The aforementioned elements 84, 86, 88, 90 form a kinematic chain that allows correlating the movement of the clamping rings 40 to that of the holding member 50**.

Finally, it should be noted that the control finger 64, best visible in FIG. 13, cooperates with an axial stop 66 formed on a fixed member 92 affixed inside the pipette.

Of course, various modifications may be made by a person skilled in the art to the invention which has just been described, solely as non-limiting examples, and the scope of which is defined by the appended claims. In particular, the above-described preferred embodiments correspond to the implementation of the invention on manual pipettes, but all teachings may be transposed to other types of pipettes, motor-driven and/or multi-channel, or on automata.

What is claimed is:

1. A positive-displacement sampling device, comprising:

an endpiece intended to carry a capillary of a piston-capillary system, the endpiece being hollow, centred on a longitudinal central axis of the endpiece;

an ejector intended to eject the piston-capillary system, movable relative to the endpiece according to an ejection axial stroke between a rest high extreme position and an ejection low extreme position, the ejector comprising an ejection end intended to be in axial contact with a capillary end during the ejection stroke;

a fixed body secured to the endpiece, a movable pipetting equipment movable in translation relative to the fixed body, the equipment comprising a movable main body and a clamp system for gripping an upper end of a piston, the clamp system comprising grasping members secured to a lower end of the movable main body, as well as a clamping ring of the grasping members, the ring being movable in translation relative to the grasping members between a radial clamping low position of the grasping members, in which the grasping members urged radially inwards allow gripping the upper end of the piston located between the grasping members, and a radial loosening high position of the grasping members, wherein the movable pipetting equipment further includes a piston driving member, a lower end of which is intended to contact the upper end of the piston during an operation of grasping the piston with the capillary fitted on the endpiece, the driving member, arranged between the grasping members, being mounted movable in translation relative to the movable main body between a maximum projection position and a minimum projection position, a first elastic return means for forcing the driving member downwards relative to the movable main body, towards the maximum projection position, the sampling device further comprising a control system of the clamping ring of the clamp system, the control system comprising a second elastic return means arranged between the clamping ring and the movable main body, this control system being designed so that during the operation of grasping the piston, upon an axial movement of the movable pipetting equipment causing the movable main body in a predetermined axial position with respect to the fixed body, the clamping ring automatically moves from the loosening high position to the clamping low position under the effect of the second elastic return means, said predetermined axial position of the movable main body being accessible, during the axial movement of the movable pipetting equipment, only after the driving member has been moved relative to the movable main body towards its minimum projection position, by bearing thereof on the piston accommodated in a bottom of the capillary fitted on the endpiece, and by countering the force generated by the first elastic return means.

2. The sampling device according to claim 1, wherein the control system of the clamping ring includes a holding member for holding the clamping ring in the loosening high position, the holding member being connected to the clamping ring, the control system also including a control part mounted movable in rotation on the movable main body of the movable pipetting equipment, according to a control part axis of rotation, the control part comprising:

a control finger intended to cooperate with a stop of the fixed body, so that during a downward axial movement of the movable pipetting equipment, pressing the finger on the stop causes the control part to pivot relative to the movable main body according to a first direction of rotation about the control part axis of rotation;

a guide track of the holding member, the guide track having a blocking transverse portion in which the holding member is held axially with respect to the control part, so as to hold the clamping ring in the loosening high position with respect to the grasping members, the guide track also having a sliding axial portion in which the holding member could slide during the automatic movement of the clamping ring from the loosening high position towards the clamping low position, under the effect of the second elastic return means, the blocking cross-section and the sliding axial portion connecting to one another at a junction area in which the holding member is brought at a predetermined level of rotation of the control part in the first direction of rotation, caused by the control finger when the movable main body has reached its predetermined axial position with respect to the fixed body;

a third elastic return means forcing the control part to pivot relative to the movable main body according to a second direction of rotation about the axis of rotation of the control part, the second direction being opposite to the first direction.

3. The sampling device according to claim 2, wherein the guide track has an L-like general shape.

4. The sampling device according to claim 2, wherein the control system of the clamping ring further includes:

a gear wheel for driving the clamping ring from the clamping low position towards the loosening high position, the gear wheel being mounted movable in rotation on the control part;

a connection member carrying the holding member at one end, and, at the other end, coupled eccentrically in rotation to the gear wheel; and a rack directed axially and carried by the ejector, the rack being intended to cooperate with the gear wheel during an operation of ejection of the piston-capillary system.

5. The sampling device according to claim 4, wherein the control system of the clamping ring is designed so that during an operation of ejection of the piston-capillary system, during which the ejector performs a downward ejection axial stroke relative to the endpiece, towards the ejection low extreme position, the rack drives the gear wheel in rotation resulting in the movement of the connecting member upwards, causing the holding member to move upwards in the sliding axial portion of the guide track, the holding member driving with it the clamping ring towards its loosening high position, and also designed so that when the holding member reaches the junction area of the guide track, the third return elastic means for forcing the control part to pivot relative to the movable main body according to the second direction of rotation so as to accommodate the holding member in a bottom of the blocking transverse portion of the guide track.

6. The sampling device according to claim 5, wherein the control system of the clamping ring is designed so that the pivoting of the control part relative to the movable main body—according to the second direction of rotation, under the action of the third elastic return means, causes separation of the gear wheel from the rack and breakage of the cooperation therebetween.

7. The sampling device according to claim 4, further comprising deflection means for allowing bringing the rack closer to the movable pipetting equipment, according to a direction transverse to the longitudinal central axis, from a predetermined level of downward axial movement of the ejector, upon movement thereof between the rest high extreme position and the ejection low extreme position.

8. The sampling device according to claim 1, wherein the sampling device is a pipette or a positive-displacement sampling automaton, manual or motor-driven, single-channel or multi-channel.

9. The sampling device according to claim 1, wherein the sampling device is of the multi-channel type, the sampling device further comprising a common control system for simultaneously controlling several clamping rings, or all of the clamping rings of the clamp systems of the multi-channel sampling device.

10. The sampling device according to claim 2, wherein the sampling device is of a single-channel type, and in that the holding member of the clamping ring in the loosening high position is mounted on an upper end of the clamping ring, or slidably accommodated in an axial groove of the movable main body of the movable pipetting equipment.

* * * * *